United States Patent
Hsu et al.

(10) Patent No.: US 9,528,653 B1
(45) Date of Patent: Dec. 27, 2016

(54) ELECTRONIC DEVICE AND SUPPORT FRAME CAPABLE OF RISING AUTOMATICALLY AND ROTATING SELECTIVELY

(71) Applicant: Wistron Corporation, New Taipei (TW)

(72) Inventors: Chia-Lung Hsu, New Taipei (TW); Po-Cheng Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/985,327

(22) Filed: Dec. 30, 2015

(30) Foreign Application Priority Data

Oct. 26, 2015 (TW) .............................. 104135015 A

(51) Int. Cl.
| | |
|---|---|
| *G06F 1/16* | (2006.01) |
| *F16M 11/18* | (2006.01) |
| *F16M 11/28* | (2006.01) |
| *F16M 11/38* | (2006.01) |

(52) U.S. Cl.
CPC .............. *F16M 11/18* (2013.01); *F16M 11/28* (2013.01); *F16M 11/38* (2013.01); *G06F 1/166* (2013.01); *G06F 1/1637* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 7,168,665 | B2 * | 1/2007 | Hong | ..................... | F16M 11/28 248/125.1 |
| 7,389,963 | B2 * | 6/2008 | Cho | ....................... | F16M 11/26 248/159 |
| 7,392,965 | B2 * | 7/2008 | Jung | ...................... | F16M 11/12 248/125.2 |
| 7,395,992 | B2 * | 7/2008 | Jung | ...................... | F16M 11/12 248/125.2 |
| 7,458,546 | B2 * | 12/2008 | Jang | ....................... | F16M 11/04 248/161 |
| 7,561,414 | B2 * | 7/2009 | Li | .......................... | G06F 1/1637 248/617 |
| 7,639,481 | B2 * | 12/2009 | Katsumata | .............. | F16M 11/04 248/921 |

(Continued)

*Primary Examiner* — Lisa Lea Edmonds
(74) *Attorney, Agent, or Firm* — Winston Hsu; Scott Margo

(57) ABSTRACT

A support frame capable of rising automatically and rotating selectively includes a frame body having a sliding groove, a sliding module slidably disposed in the sliding groove, a first resilient member, an operating member, a second resilient member, a rotating member pivotally connected to the sliding module, a torsion member, a linking member movably disposed on the sliding module, an engaging member movably disposed on the rotating member, and a driving member disposed on the frame body. The sliding module has an engaging recess. The first resilient member is connected to the frame body and the sliding module. The operating member is connected to the frame body and engaged with the engaging recess. The second resilient member is connected to the frame body and the operating member. The torsion member is connected to the sliding module and the rotating member. The engaging member is engaged with the sliding module.

16 Claims, 20 Drawing Sheets

(56) References Cited

U.S. PATENT DOCUMENTS

| | | | | |
|---|---|---|---|---|
| 7,722,003 B2* | 5/2010 | Ishizaki | F16M 11/24 248/125.1 |
| 7,854,417 B2* | 12/2010 | Gan | F16M 11/24 248/122.1 |
| 8,132,765 B2* | 3/2012 | Liu | F16M 11/046 248/157 |
| 8,286,927 B2* | 10/2012 | Sweere | A47B 21/0073 108/147 |
| 8,390,997 B1* | 3/2013 | Dominy | G06F 1/1616 361/679.05 |
| 8,408,505 B2* | 4/2013 | Ye | F16M 11/08 248/161 |
| 9,039,016 B2* | 5/2015 | Abernethy | B62B 3/02 280/6.15 |
| 9,188,275 B2* | 11/2015 | Ergun | A47B 21/02 |
| 9,326,406 B2* | 4/2016 | Brandt | H05K 7/00 |
| 9,407,737 B2* | 8/2016 | Ahn | H04M 1/0237 |
| 2003/0142064 A1* | 7/2003 | Wang | B60R 11/0235 345/156 |
| 2003/0142468 A1* | 7/2003 | Chin | A47B 9/14 361/679.02 |
| 2003/0234332 A1* | 12/2003 | Yen | F16M 11/24 248/404 |
| 2006/0011788 A1* | 1/2006 | Jang | F16M 11/10 248/132 |
| 2007/0252919 A1* | 11/2007 | McGreevy | F16M 11/10 348/825 |
| 2007/0262209 A1* | 11/2007 | She | F16M 11/046 248/122.1 |
| 2008/0087790 A1* | 4/2008 | Tseng | F16M 11/26 248/624 |
| 2011/0079692 A1* | 4/2011 | Li | F16M 11/04 248/220.21 |
| 2011/0090410 A1* | 4/2011 | Ye | F16M 11/105 348/836 |

* cited by examiner

ELECTRONIC DEVICE AND SUPPORT FRAME CAPABLE OF RISING AUTOMATICALLY AND ROTATING SELECTIVELY

BACKGROUND OF THE INVENTION

1. Field of the Invention

The invention relates to an electronic device and a support frame thereof and, more particularly, to a support frame capable of rising automatically and rotating selectively and an electronic device equipped with the support frame.

2. Description of the Prior Art

When a user uses a notebook computer or a desktop computer, he/she always browses the information of interesting through a display. In general, a transverse length of the display is larger than a longitudinal length of the display and it only allows the user to browse the information on the display in a landscape mode. However, at the present information age, more and more people have to browse document, website, e-mail and so on through the display every day and those information may be displayed more completely in a portrait mode for the user to browse. Nowadays, some displays allow the user to rotate them with 90 degrees, so as to switch the landscape mode to the portrait mode. However, in the prior art, the user has to lift the display manually first and then rotate the display with 90 degrees manually. The aforesaid operation is very inconvenient.

SUMMARY OF THE INVENTION

The invention provides a support frame capable of rising automatically and rotating selectively and an electronic device equipped with the support frame, so as to solve the aforesaid problems.

According to an embodiment of the invention, a support frame capable of rising automatically and rotating selectively comprises a frame body, a sliding module, a first resilient member, an operating member, a second resilient member, a rotating member, a torsion member, a linking member, an engaging member, and a driving member. The frame body has a sliding groove. The sliding module is slidably disposed in the sliding groove. The sliding module has an engaging recess. The first resilient member is disposed in the sliding groove. Opposite ends of the first resilient member are connected to the frame body and the sliding module, respectively. The operating member is pivotally connected to the frame body. The operating member has an engaging portion and a press portion. The engaging portion is engaged in the engaging recess, such that the sliding module compresses the first resilient member. The press portion is exposed from the frame body. The second resilient member is disposed on the frame body. Opposite ends of the second resilient member are connected to the frame body and the operating member, respectively. The rotating member is pivotally connected to the sliding module. The torsion member is disposed between the sliding module and the rotating member. Opposite ends of the torsion member are connected to the sliding module and the rotating member, respectively. The torsion member is twisted in advance before the rotating member rotates with respect to the sliding module. The linking member is movably disposed on the sliding module. The engaging member is movably disposed on the rotating member. The engaging member abuts against the linking member and is engaged with the sliding module. The driving member is disposed on the frame body. When the press portion is pressed, the second resilient member is compressed and the engaging portion is disengaged from the engaging recess, such that the first resilient member generates an elastic force to drive the sliding module to slide along the sliding groove. When the sliding module slides along the sliding groove to drive the linking member to move to a position corresponding to the driving member, the driving member drives the linking member to move and the linking member drives the engaging member to move, such that the engaging member is disengaged from the sliding module. When the engaging member is disengaged from the sliding module, the torsion member generates a torsion to drive the rotating member to rotate with respect to the sliding module.

According to another embodiment of the invention, an electronic device comprises a base, a display module, and a support frame capable of rising automatically and rotating selectively. The support frame capable of rising automatically and rotating selectively is disposed on the base. The support frame comprises a frame body, a sliding module, a first resilient member, an operating member, a second resilient member, a rotating member, a torsion member, a linking member, an engaging member, and a driving member. The frame body has a sliding groove. The sliding module is slidably disposed in the sliding groove. The sliding module has an engaging recess. The first resilient member is disposed in the sliding groove. Opposite ends of the first resilient member are connected to the frame body and the sliding module, respectively. The operating member is pivotally connected to the frame body. The operating member has an engaging portion and a press portion. The engaging portion is engaged in the engaging recess, such that the sliding module compresses the first resilient member. The press portion is exposed from the frame body. The second resilient member is disposed on the frame body. Opposite ends of the second resilient member are connected to the frame body and the operating member, respectively. The rotating member is pivotally connected to the sliding module. The display module is disposed on the rotating member. The torsion member is disposed between the sliding module and the rotating member. Opposite ends of the torsion member are connected to the sliding module and the rotating member, respectively. The torsion member is twisted in advance before the rotating member rotates with respect to the sliding module. The linking member is movably disposed on the sliding module. The engaging member is movably disposed on the rotating member. The engaging member abuts against the linking member and is engaged with the sliding module. The driving member is disposed on the frame body. When the press portion is pressed, the second resilient member is compressed and the engaging portion is disengaged from the engaging recess, such that the first resilient member generates an elastic force to drive the sliding module to slide along the sliding groove. When the sliding module slides along the sliding groove to drive the linking member to move to a position corresponding to the driving member, the driving member drives the linking member to move and the linking member drives the engaging member to move, such that the engaging member is disengaged from the sliding module. When the engaging member is disengaged from the sliding module, the torsion member generates a torsion to drive the rotating member to rotate with respect to the sliding module.

As mentioned in the above, the invention may dispose the display module on the rotating member of the support frame. When a user presses the press portion of the operating member, the display module will rise and rotate automatically (e.g. rotate with 90 degrees to switch the display module from landscape mode to portrait mode). Accordingly, the operation of the invention is very convenient. It should be noted that the invention may also dispose other objects on the rotating member according to practical applications and the invention is not limited to dispose the display module on the rotating member.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
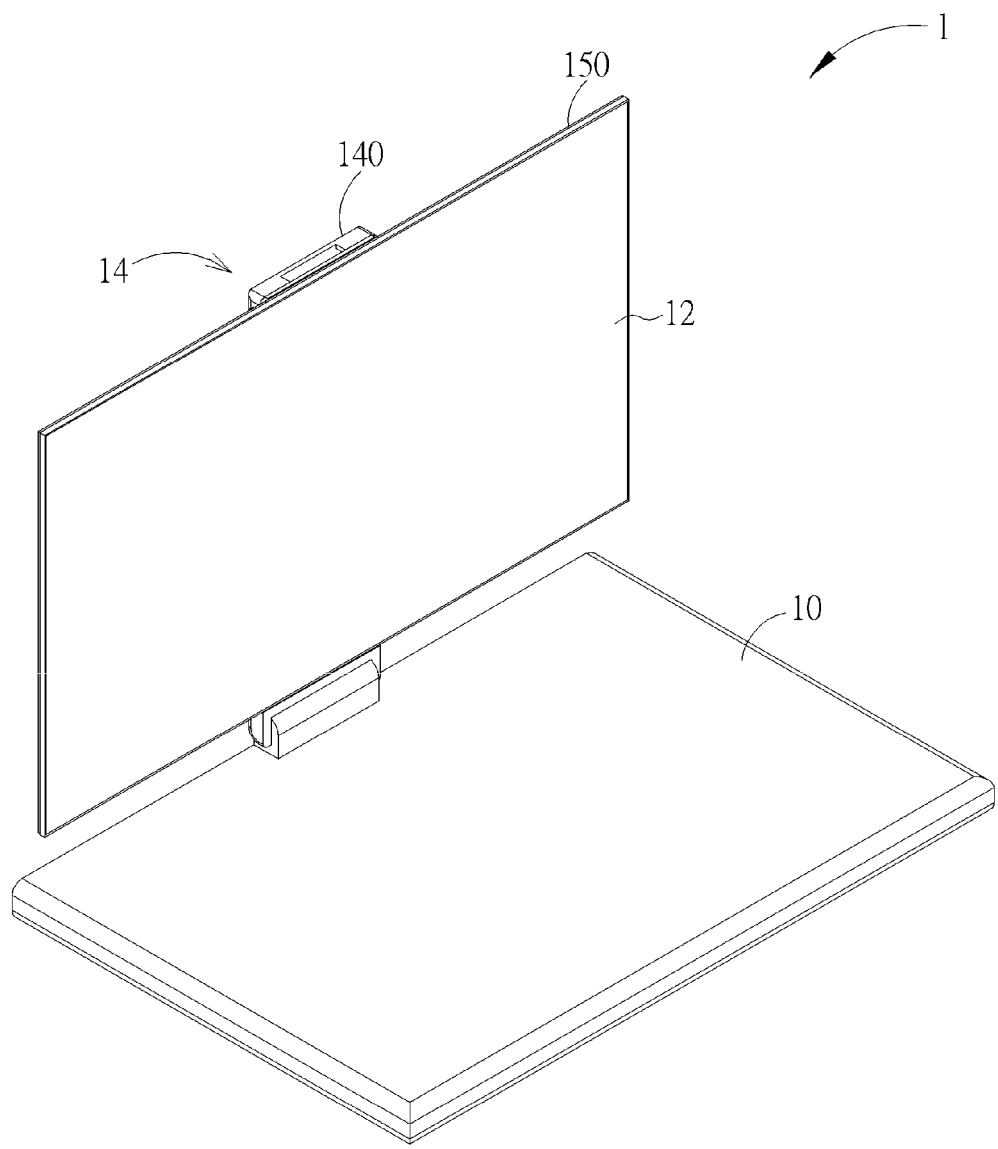
FIG. 1 is a perspective view illustrating an electronic device according to an embodiment of the invention.
Figure 2:
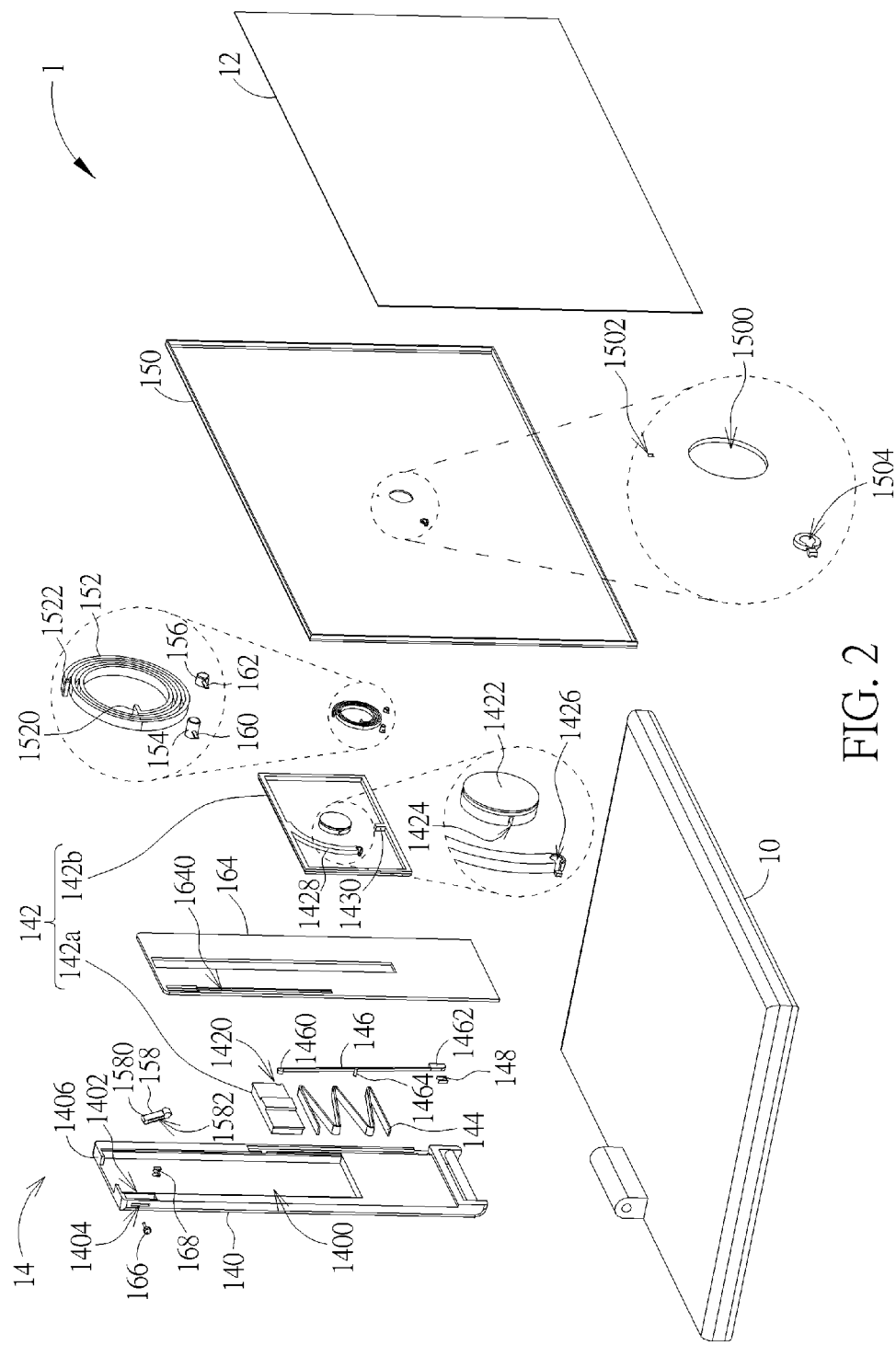
FIG. 2 is an exploded view illustrating the electronic device shown in FIG. 1.
Figure 3:
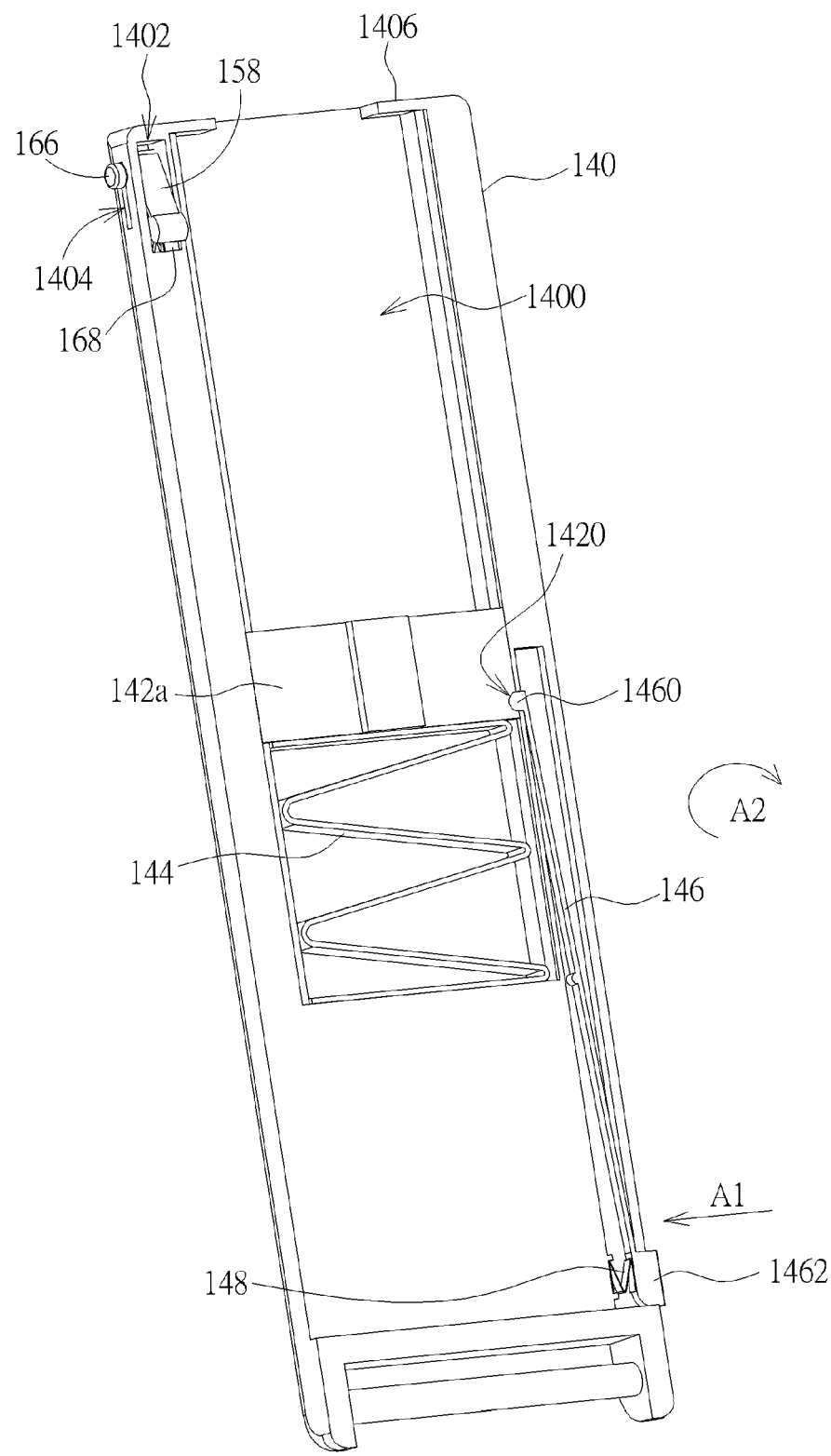
FIG. 3 is an assembly view illustrating some components shown in FIG. 2.
Figure 4:
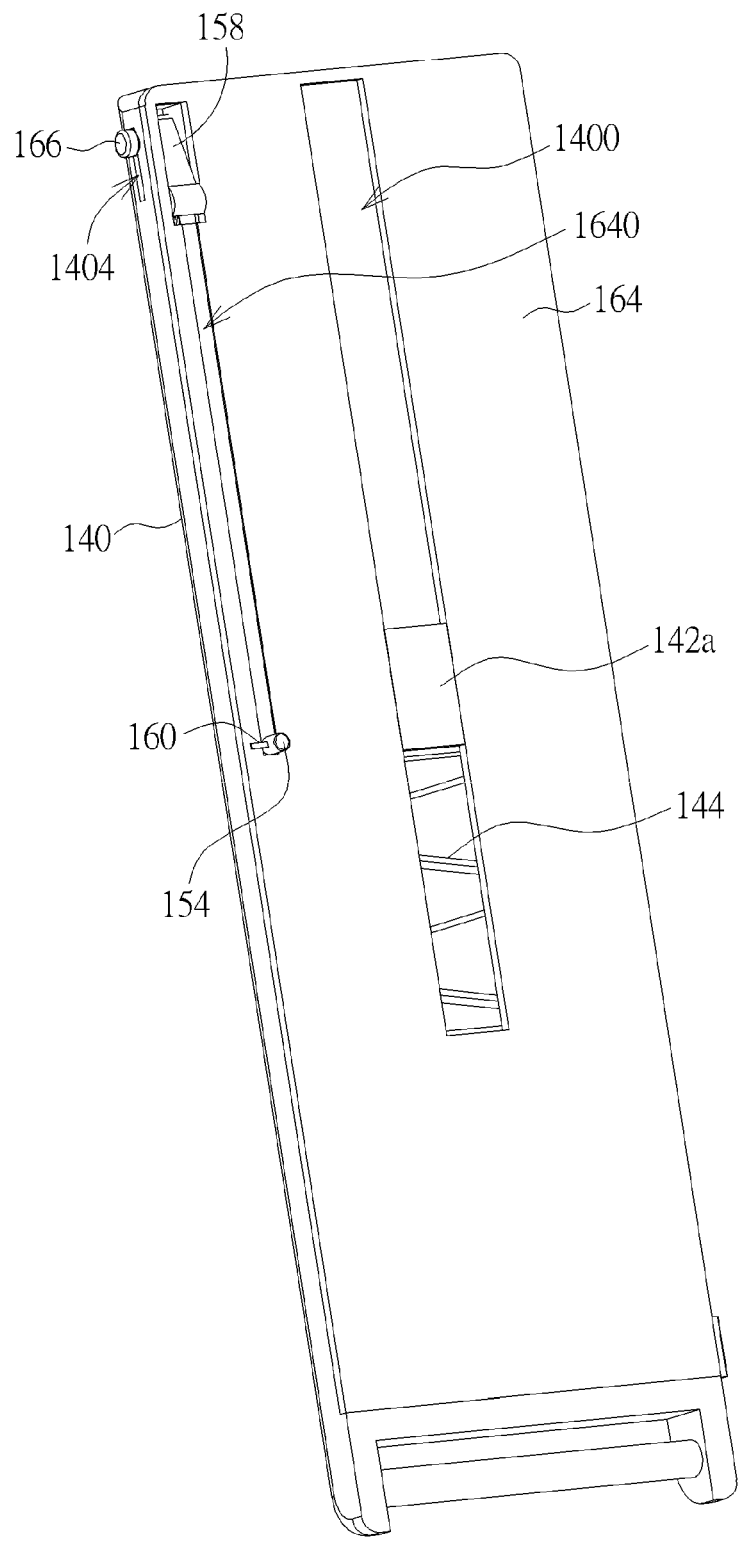
FIG. 4 is another assembly view illustrating some components shown in FIG. 2.
Figure 5:
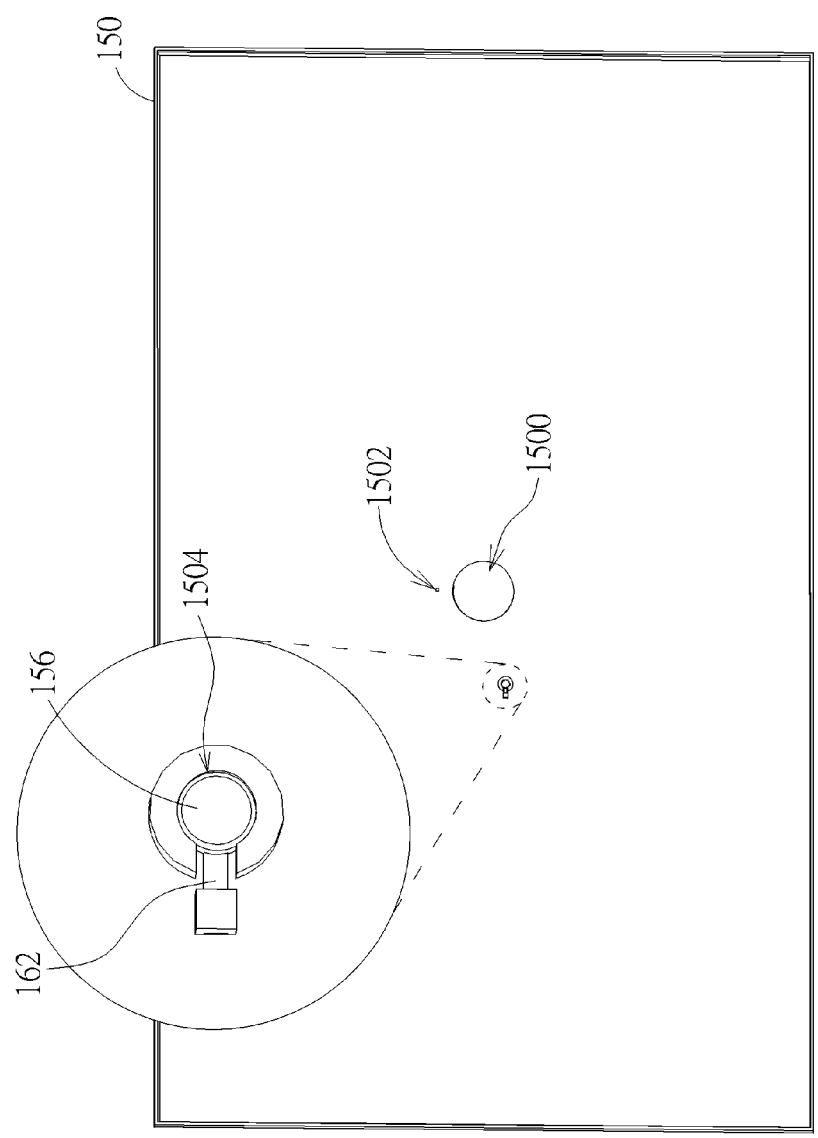
FIG. 5 is a front assembly view illustrating the engaging member, the second resilient plate and the rotating member.
Figure 6:
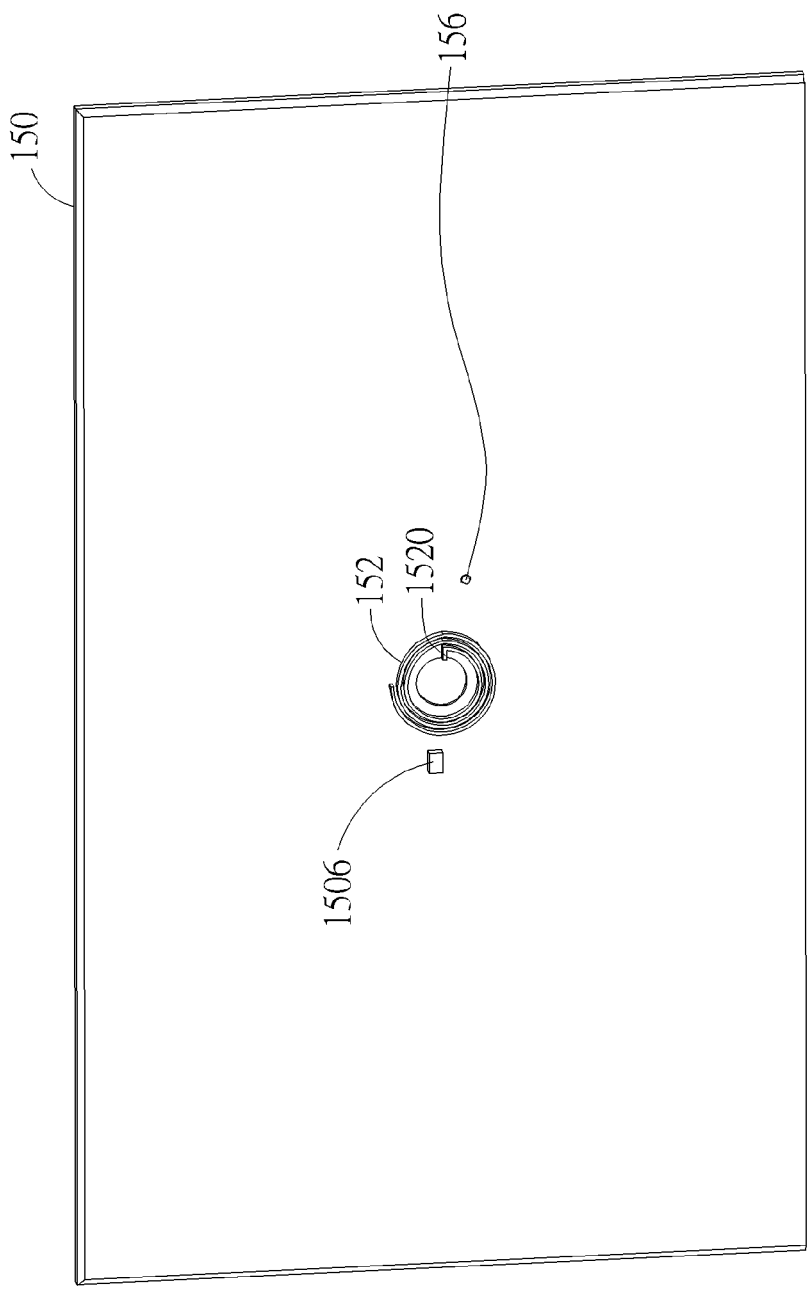
FIG. 6 is a rear assembly view illustrating the engaging member, the torsion member and the rotating member.
Figure 7:
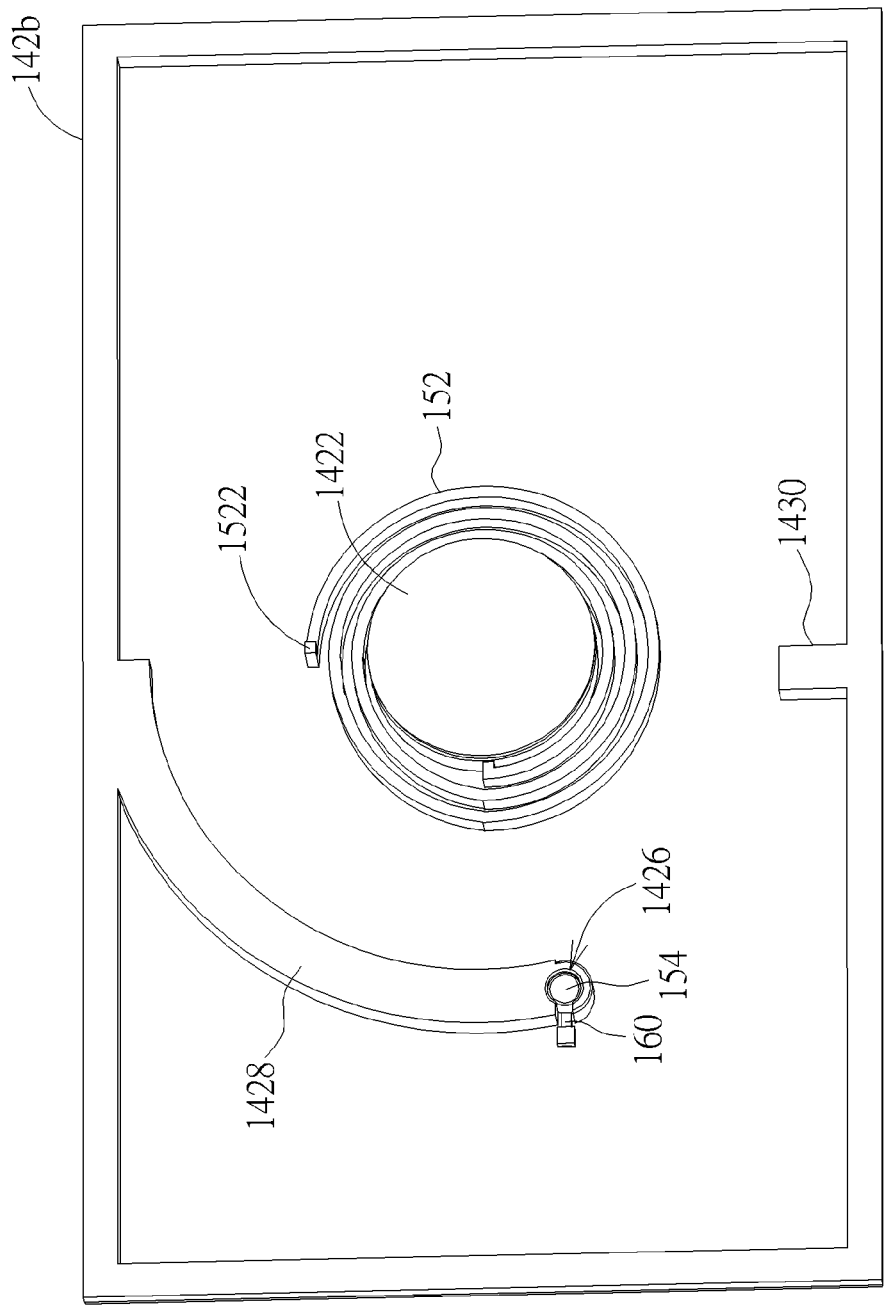
FIG. 7 is an assembly view illustrating the linking member, the first resilient plate, the torsion member and the second sliding member.
Figure 8:
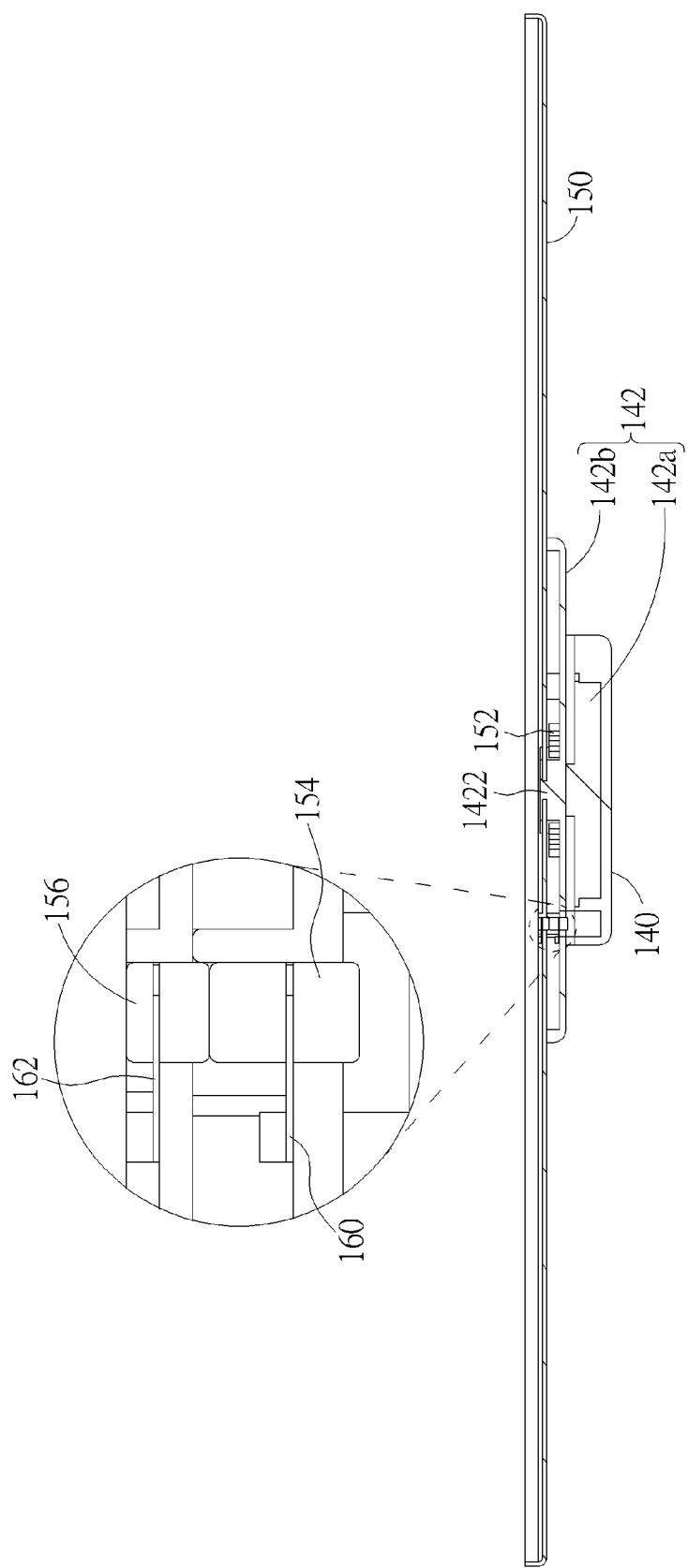
FIG. 8 is a sectional view illustrating the engaging member and the linking member disposed on the rotating member and the second sliding member, respectively.
Figure 9:
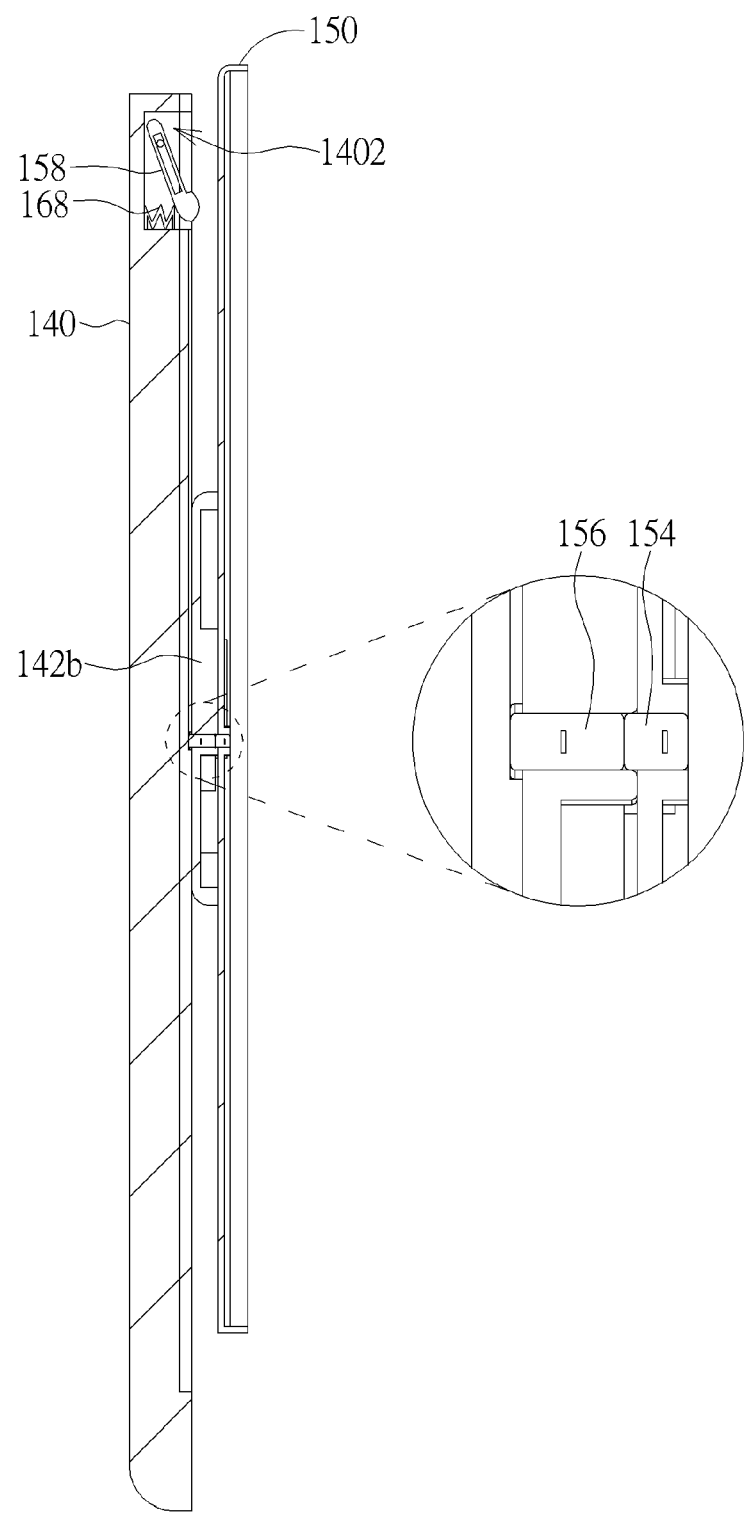
FIG. 9 is another sectional view illustrating the engaging member and the linking member disposed on the rotating member and the second sliding member, respectively.

Referring to FIGS. 1 to 9, FIG. 1 is a perspective view illustrating an electronic device 1 according to an embodiment of the invention, FIG. 2 is an exploded view illustrating the electronic device 1 shown in FIG. 1, FIG. 3 is an assembly view illustrating some components shown in FIG. 2, FIG. 4 is another assembly view illustrating some components shown in FIG. 2, FIG. 5 is a front assembly view illustrating the engaging member 156, the second resilient plate 162 and the rotating member 150, FIG. 6 is a rear assembly view illustrating the engaging member 156, the torsion member 152 and the rotating member 150, FIG. 7 is an assembly view illustrating the linking member 154, the first resilient plate 160, the torsion member 152 and the second sliding member 142b, FIG. 8 is a sectional view illustrating the engaging member 156 and the linking member 154 disposed on the rotating member 150 and the second sliding member 142b, respectively, and FIG. 9 is another sectional view illustrating the engaging member 156 and the linking member 154 disposed on the rotating member 150 and the second sliding member 142b, respectively.

As shown in FIG. 1, the electronic device 1 comprises a base 10, a display module 12 and a support frame 14 capable of rising automatically and rotating selectively, wherein the support frame 14 is disposed on the base 10 and the display module 12 is disposed on the support frame 14. In practical applications, the electronic device 1 may be a notebook computer, an all-in-one computer, a display or other display devices and the display module 12 may be a liquid crystal display module or other display modules. When the electronic device 1 is a notebook computer, the base 10 may be equipped with a keyboard and/or a touch panel according to practical applications. Furthermore, the support frame 14 may be pivotally connected to the base 10, such that the support frame 14 may rotate with respect to the base 10, so as to drive the display module 12 to open or close with respect to the base 10. It should be noted that, the invention may also dispose other objects on the support frame 14 according to practical applications and the invention is not limited to dispose the display module 12 on the support frame 14.

As shown in FIG. 2, the support frame 14 capable of rising automatically and rotating selectively comprises a frame body 140, a sliding module 142, a first resilient member 144, an operating member 146, a second resilient member 148, a rotating member 150, a torsion member 152, a linking member 154, an engaging member 156, a driving member 158, a first resilient plate 160, a second resilient plate 162, a cover 164, a switch member 166, and a third resilient member 168. In this embodiment, the sliding module 142 may comprise a first sliding member 142a and a second sliding member 142b.

As shown in FIG. 3, the frame body 140 has a sliding groove 1400, an accommodating recess 1402 and a first slot 1404. The first sliding member 142a of the sliding module 142 is slidably disposed in the sliding groove 1400. As shown in FIG. 8, the second sliding member 142b is connected to the first sliding member 142a, so the first sliding member 142a and the second sliding member 142b can slide together along the sliding groove 1400. Furthermore, the first sliding member 142a has an engaging recess 1420. The first resilient member 144 is disposed in the sliding groove 1400 and opposite ends of the first resilient member 144 are connected to the frame body 140 and the first sliding member 142a of the sliding module 142, respectively. In this embodiment, the first resilient member 144 may be a spring or other resilient objects. The operating member 146 is pivotally connected to the frame body 140. In this embodiment, the operating member 146 may be pivotally connected to the frame body 140 by a pivot portion 1464. The operating member 146 has an engaging portion 1460 and a press portion 1462. As shown in FIG. 3, the engaging portion 1460 of the operating member 146 can be engaged in the engaging recess 1420 of the first sliding member 142a, such that the first sliding member 142a of the sliding module 142 compresses the first resilient member 144. In other words, when the engaging portion 1460 of the operating member 146 is engaged in the engaging recess 1420 of the first sliding member 142a, the first resilient member 144 is compressed. Moreover, the press portion 1462 of the operating member 146 is exposed from the frame body 140.

As shown in FIG. 3, the second resilient member 148 is disposed on the frame body 140 and opposite ends of the second resilient member 148 are connected to the frame body 140 and the press portion 1462 of the operating member 146, respectively. In this embodiment, the second resilient member 148 may be a spring or other resilient objects. As shown in FIGS. 1 and 3, the accommodating recess 1402 of the frame body 140 communicates with the first slot 1404. The driving member 158 is disposed on the frame body 140. In this embodiment, the driving member 158 may be pivotally connected in the accommodating recess 1402 by a pivot portion 1580. The driving member 158 has a second slot 1582. When the driving member 158 is pivotally connected in the accommodating recess 1402 of the frame body 140, an end of the switch member 166 can be movably inserted into the first slot 1404 of the frame body 140 and the second slot 1582 of the driving member 158. As shown in FIG. 9, the third resilient member 168 is disposed in the accommodating recess 1402 of the frame body 140 and opposite ends of the third resilient member 168 are connected to the frame body 140 and an end of the driving member 158, respectively. Accordingly, when the switch member 166 is switched to an upper edge of the first slot 1404 (as shown in FIG. 3), the third resilient member 168 will push the end of the driving member 158 out of the accommodating recess 1402. At this time, an angle is included between the second slot 1582 of the driving member 158 and the first slot 1404 of the frame body 140 (i.e. the second slot 1582 of the driving member 158 is non-parallel to the first slot 1404 of the frame body 140). Accordingly, when the user switches the switch member 166 to a lower edge of the first slot 1404, the driving member 158 will sink into the accommodating recess 1402 and compress the third resilient member 168. When the user switches the switch member 166 to the upper edge of the first slot 1404 again, the compressed third resilient member 168 will generate an elastic force to drive the driving member 158 to protrude from the accommodating recess 1402.

The rotating member 150 is pivotally connected to the second sliding member 142b of the sliding module 142, such that the rotating member 150 can rotate with respect to the second sliding member 142b. As shown in FIGS. 2 and 8, the rotating member 150 may be pivotally connected to a pillar 1422 of the second sliding member 142b through a hole 1500, but the invention is not limited to this manner. In this embodiment, since the display module 12 is disposed on the rotating member 150, the display module 12 can rotate with the rotating member together with respect to the second sliding member 142b. It should be noted that when the display module 12 is disposed on the rotating member 150, the rotating member 150 may be served as a back cover of the display module 12, i.e. the rotating member 150 may be manufactured with the display module 12 integrally.

As shown in FIGS. 2, 6 and 7, the torsion member 152 is disposed between the second sliding member 142b of the sliding module 142 and the rotating member 150, and opposite ends of the torsion member 152 are connected to the second sliding member 142b of the sliding module 142 and the rotating member 150, respectively. The torsion member 152 is twisted in advance before the rotating member 150 rotates with respect to the sliding module 142 (i.e. the rotating member 150 is situated at the state shown in FIG. 1). As shown in FIG. 2, opposite ends 1520, 1522 of the torsion member 152 may be inserted and fixed in a hole 1424 of the second sliding member 142b and a hole 1502 of the rotating member 150, respectively.

As shown in FIG. 7, the linking member 154 is movably disposed on the second sliding member 142b of the sliding module 142. In this embodiment, the linking member 154 may be disposed in a hole 1426 of the second sliding member 142b, such that the linking member 154 can move in the hole 1426 with respect to the second sliding member 142b. Furthermore, opposite ends of the first resilient plate 160 are connected to the second sliding member 142b of the sliding module 142 and the linking member 154, respectively. Accordingly, when the linking member 154 moves with respect to the second sliding member 142b, the first resilient plate 160 will be bended to generate an elastic force.

As shown in FIG. 5, the engaging member 156 is movably disposed on the rotating member 150. In this embodiment, the engaging member 156 may be disposed in a hole 1504 of the rotating member 150, such that the engaging member 156 can move in the hole 1504 with respect to the rotating member 150. Furthermore, opposite ends of the second resilient plate 162 are connected to the rotating member 150 and the engaging member 156, respectively. Accordingly, when the engaging member 156 moves with respect to the rotating member 150, the second resilient plate 162 will be bended to generate an elastic force.

As shown in FIGS. 8 and 9, after the engaging member 156 and the linking member 154 are disposed on the rotating member 150 and the second sliding member 142b, respectively, the engaging member 156 abuts against the linking member 154 and is engaged with the second sliding member 142b. Since the engaging member 156 is engaged with the second sliding member 142b, the rotating member 150 cannot rotate with respect to the sliding module 142.

As shown in FIG. 4, the cover 164 is disposed on the frame body 140. In this embodiment, the cover 164 has a guiding groove 1640 and the linking member 154, which is disposed on the second sliding member 142b, is located in the guiding groove 1640. In other words, when the sliding module 142 slides along the sliding groove 1400 of the frame body 140, the linking member 154 slides along the guiding groove 1640 of the cover 164.

Figure 10:
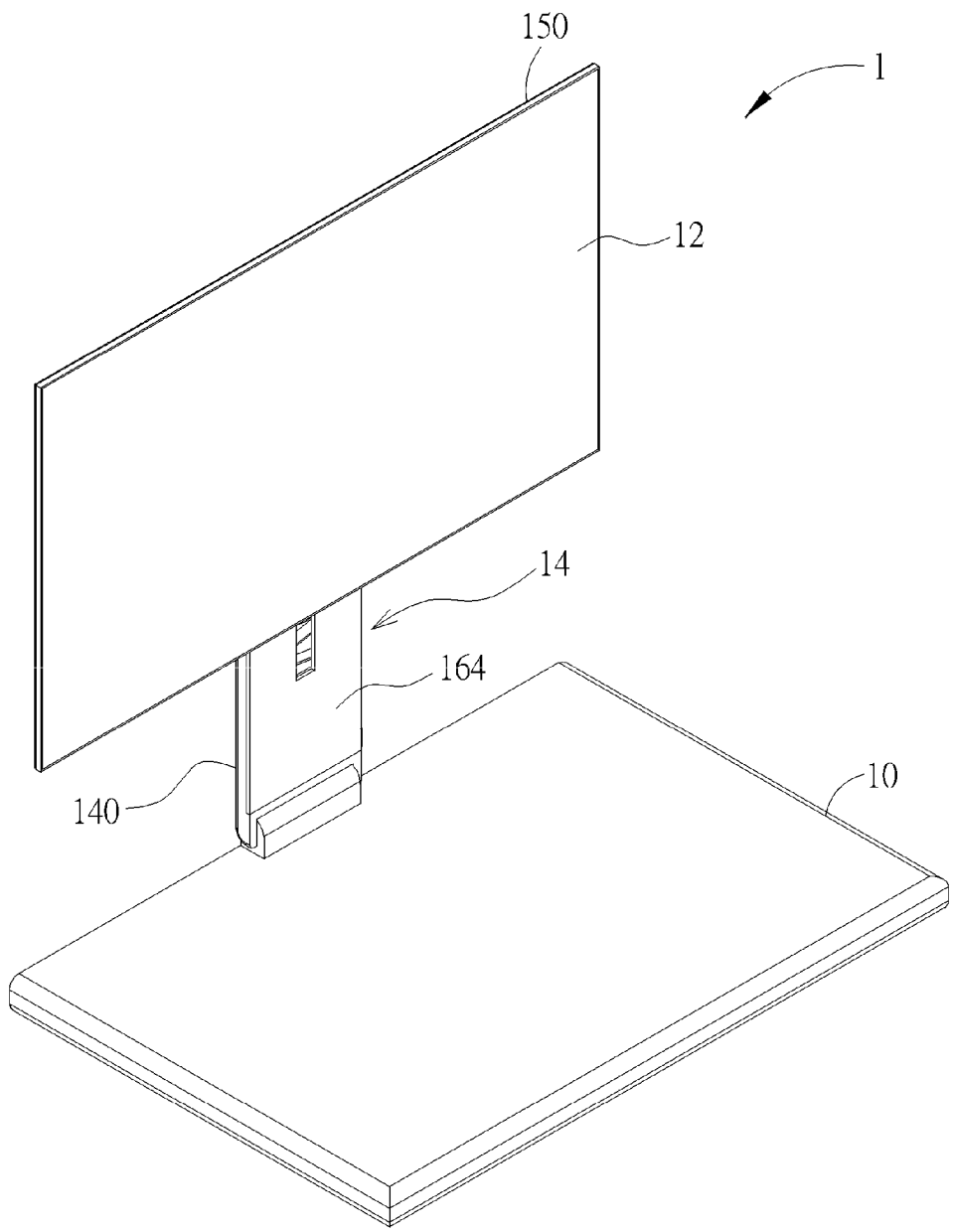
FIG. 10 is a perspective view illustrating that the rotating member drives the display module to rise.
Figure 11:
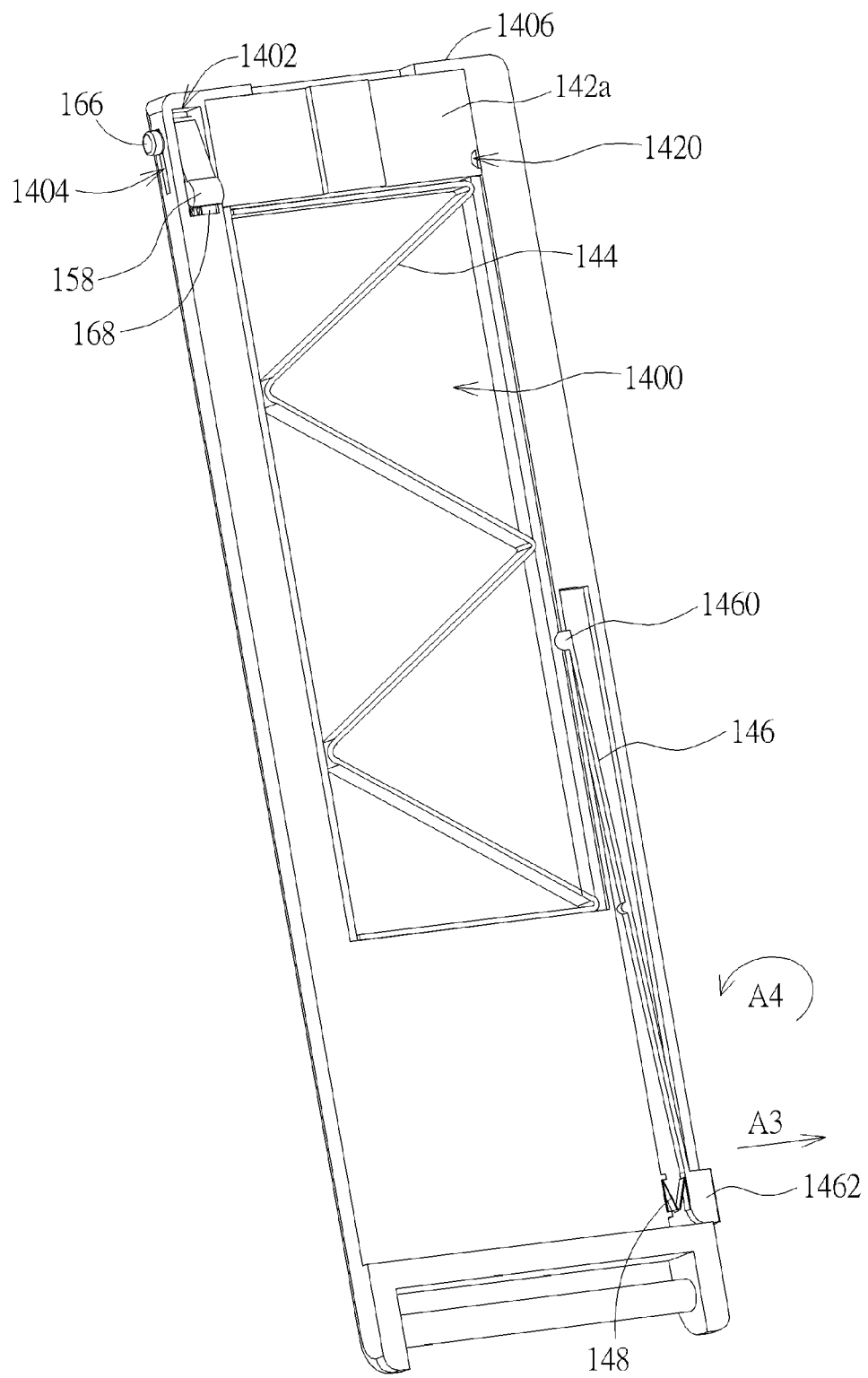
FIG. 11 is a perspective view illustrating that the first resilient member drives the first sliding member to slide along the sliding groove.
Figure 12:
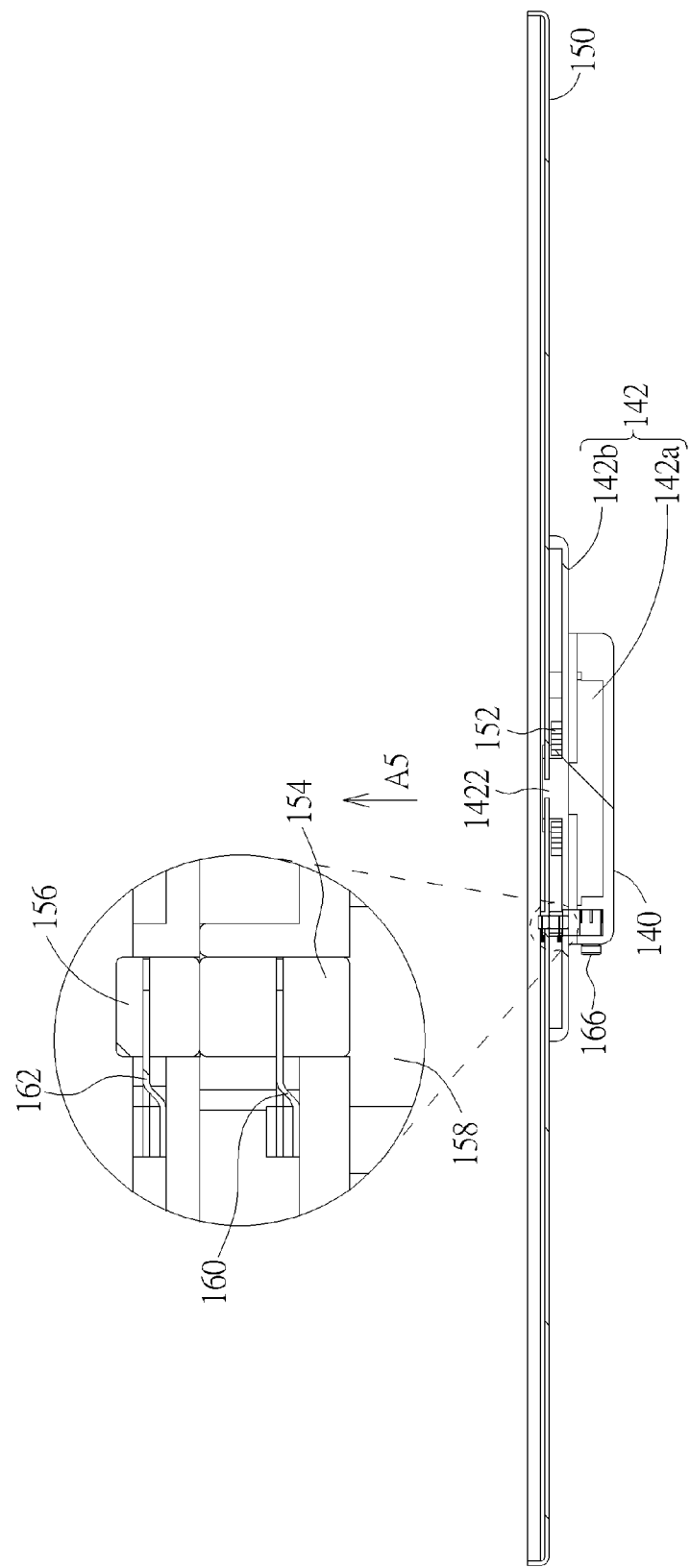
FIG. 12 is a sectional view illustrating that the driving member drives the linking member to move and the linking member drives the engaging member to move.
Figure 13:
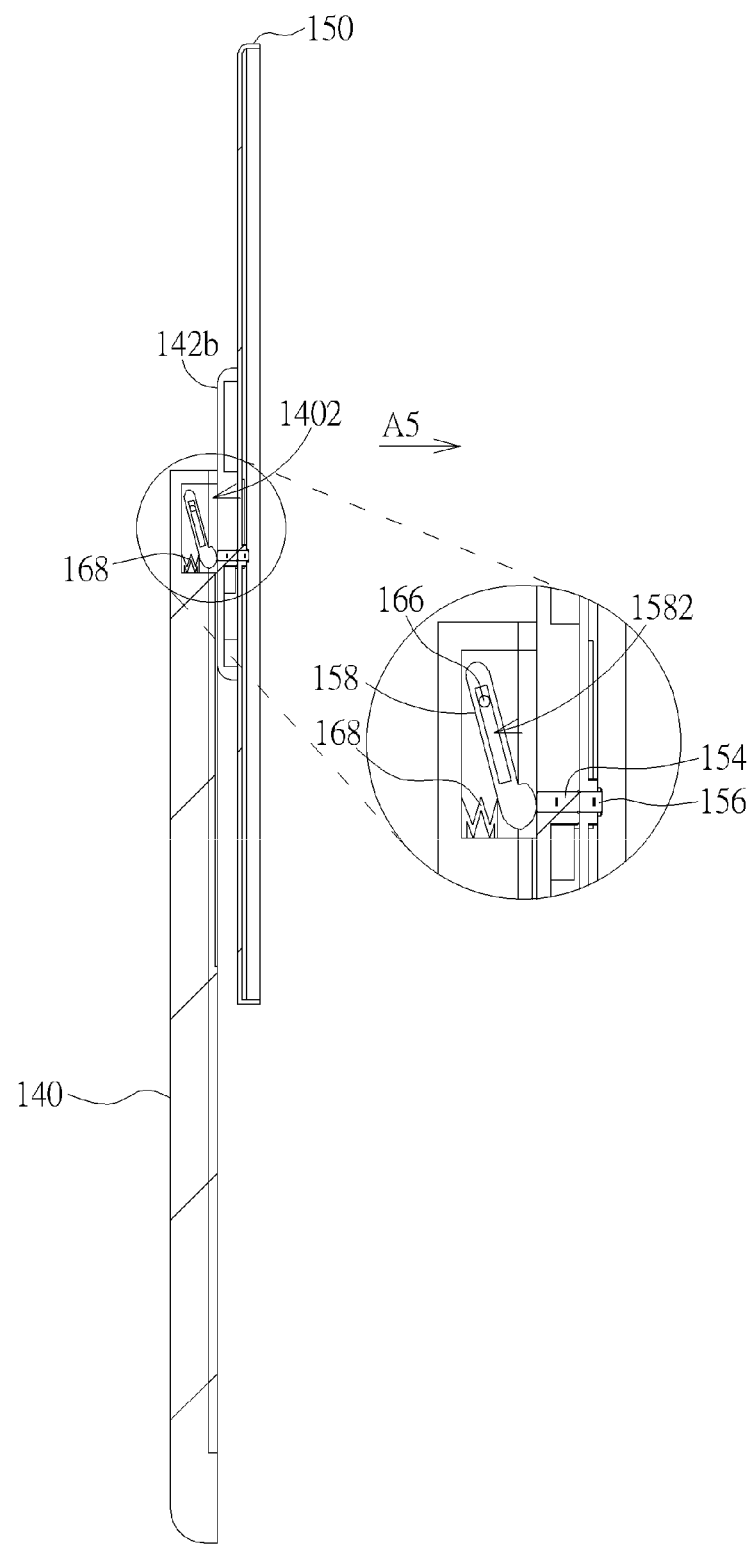
FIG. 13 is another sectional view illustrating that the driving member drives the linking member to move and the linking member drives the engaging member to move.
Figure 14:
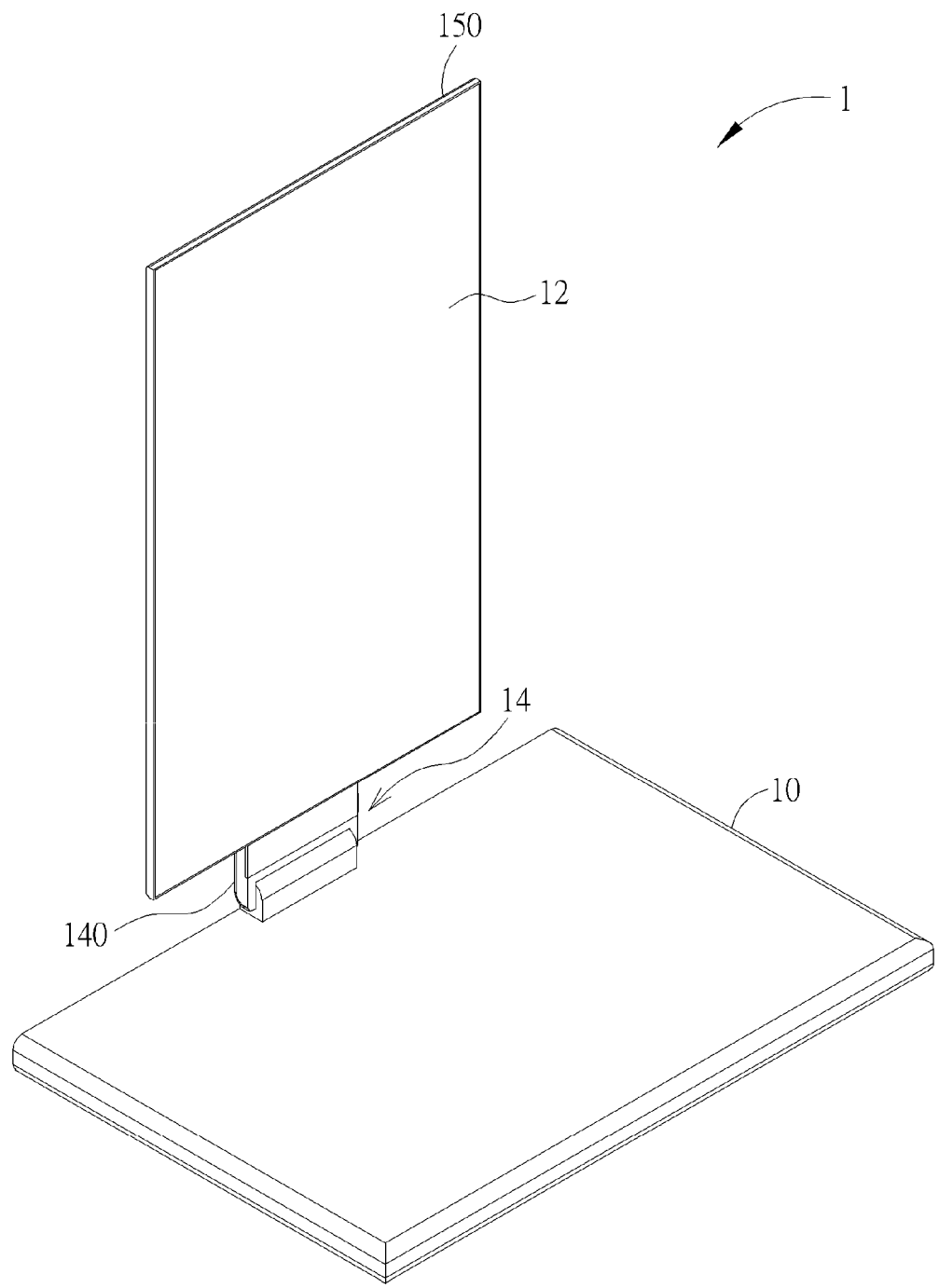
FIG. 14 is a perspective view illustrating that the rotating member drives the display module to rotate.
Figure 15:
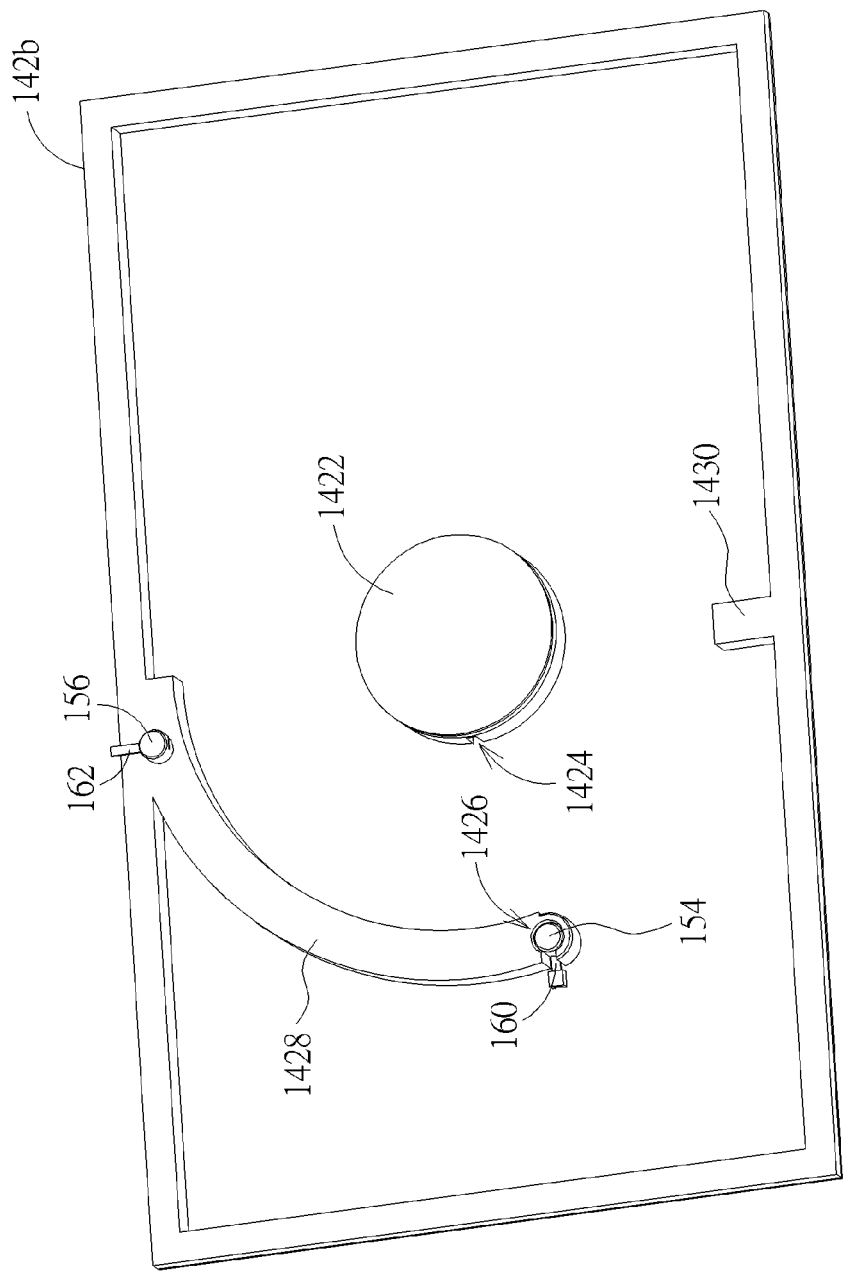
FIG. 15 is a perspective view illustrating that the engaging member slides along the arc-shaped sliding rail.

As shown in FIGS. 10 to 15, FIG. 10 is a perspective view illustrating that the rotating member 150 drives the display module 12 to rise, FIG. 11 is a perspective view illustrating that the first resilient member 144 drives the first sliding member 142a to slide along the sliding groove 1400, FIG. 12 is a sectional view illustrating that the driving member 158 drives the linking member 154 to move and the linking member 154 drives the engaging member 156 to move, FIG. 13 is another sectional view illustrating that the driving member 158 drives the linking member 154 to move and the linking member 154 drives the engaging member 156 to move, FIG. 14 is a perspective view illustrating that the rotating member 150 drives the display module 12 to rotate, and FIG. 15 is a perspective view illustrating that the engaging member 156 slides along the arc-shaped sliding rail 1428.

When a user wants to switch the display module 12 from landscape mode (as shown in FIG. 1) to portrait mode (as shown in FIG. 14), the user has to switch the switch member 166 to the upper edge of the first slot 1404 (as shown in FIG. 3), such that the third resilient member 168 pushes the end of the driving member 158 out of the accommodating recess 1402. Afterward, the user can press the press portion 1462 of the operating member 146 in a direction indicated by an arrow A1 shown in FIG. 3. When the press portion 1462 of the operating member 146 is pressed, the operating member 146 will rotate with respect to the frame body 140 in a direction indicated by an arrow A2. At this time, the second resilient member 148 is compressed and the engaging portion 1460 of the operating member 146 is disengaged from the engaging recess 1420 of the first sliding member 142a, such that the first resilient member 144 compressed by the first sliding member 142a generates an elastic force to drive the first sliding member 142a of the sliding module 142 to slide along the sliding groove 1400 of the frame body 140. At this time, the sliding module 142 will drive the rotating member 150 and the display module 12 to rise to a position shown in FIG. 10. As shown in FIG. 11, there is a restraining portion 1406 on the top of the frame body 140 and the restraining portion 1406 is used for restraining a rising height of the first sliding member 142a of the sliding module 142. Furthermore, when the user releases the press portion 1462 of the operating member 142, the compressed second resilient member 148 will generate an elastic force to push the press portion 1462 of the operating member 146 in a direction indicated by an arrow A3, so as to drive the operating member 146 to rotate with respect to the frame body 140 in a direction indicated by an arrow A4 and then return to the initial position.

As shown in FIGS. 12 and 13, when the sliding module 142 slides along the sliding groove 1400 of the frame body 140 to drive the linking member 154 to move to a position corresponding to the driving member 158, the driving member 158 will drive the linking member 154 to move and the linking member 154 will drive the engaging member 156 to move, such that the engaging member 156 will move in a direction indicated by an arrow A5, so as to be disengaged from the second sliding member 142b of the sliding module 142. When the engaging member 156 is disengaged from the second sliding member 142b of the sliding module 142, the torsion member 152, which is twisted in advance, will generate a torsion to drive the rotating member 150 to rotate with respect to the sliding module 142. At this time, the display module 12 will rotate with the rotating member 150 together to the position shown in FIG. 14.

Therefore, after the user presses the press portion 1462 of the operating member 146, the support frame 14 of the invention allows the display module 12 to rise and rotate automatically (e.g. rotate with 90 degrees to switch the display module 12 from landscape mode to portrait mode). Accordingly, the operation of the invention is very convenient.

As shown in FIG. 15, the second sliding member 142b of the sliding module 142 may further has an arc-shaped sliding rail 1428 connected to the hole 1426. When the rotating member 150 rotates with respect to the sliding module 142, the engaging member 156 abuts against the arc-shaped sliding rail 1428 and slides along the arc-shaped sliding rail 1428. In other words, when the rotating member 150 rotates with respect to the sliding module 142, the arc-shaped sliding rail 1428 will restrain the engaging member 156 at the same horizontal position as shown in FIG. 12.

Figure 16:
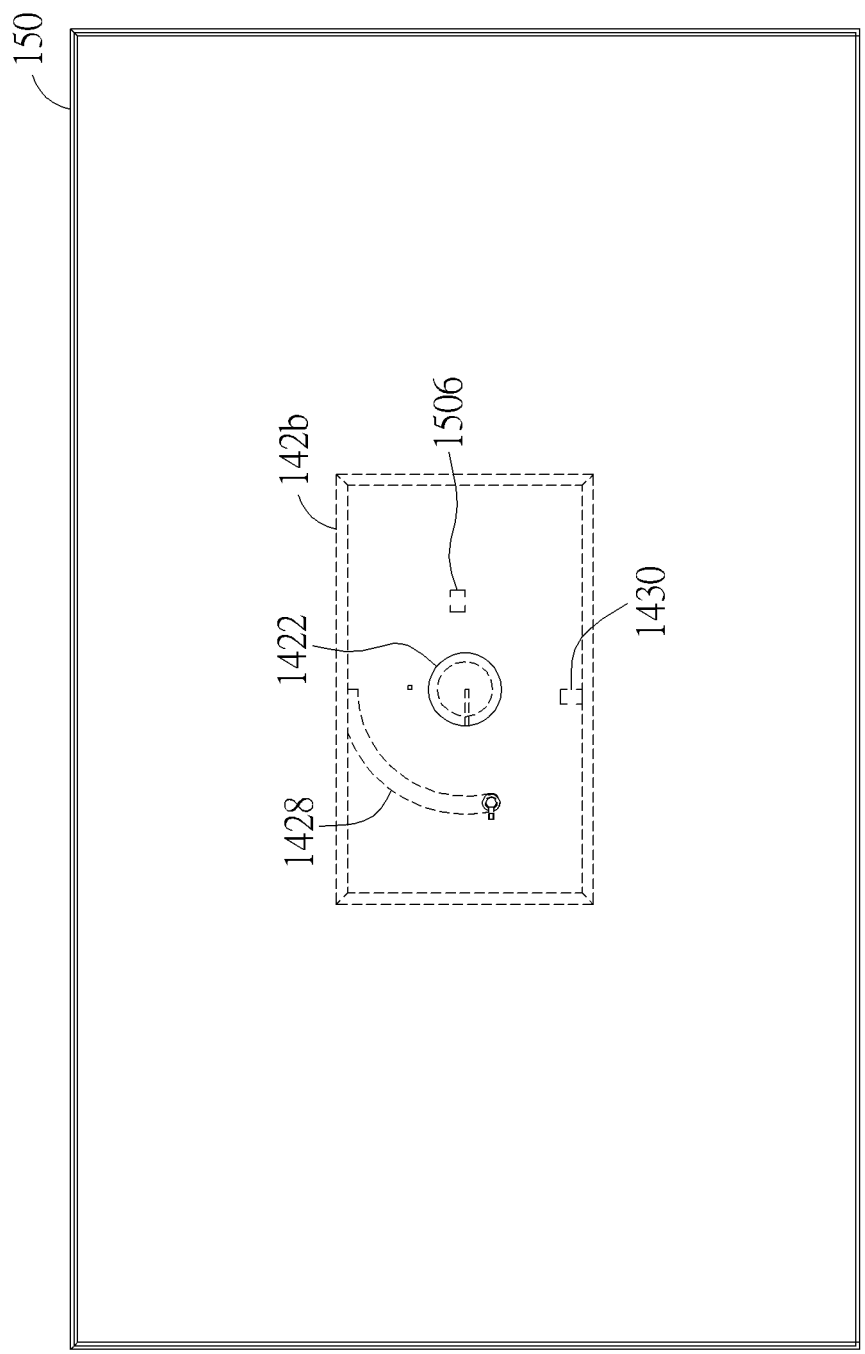
FIG. 16 is a perspective view illustrating a state before the rotating member rotates with respect to the second sliding member.
Figure 17:
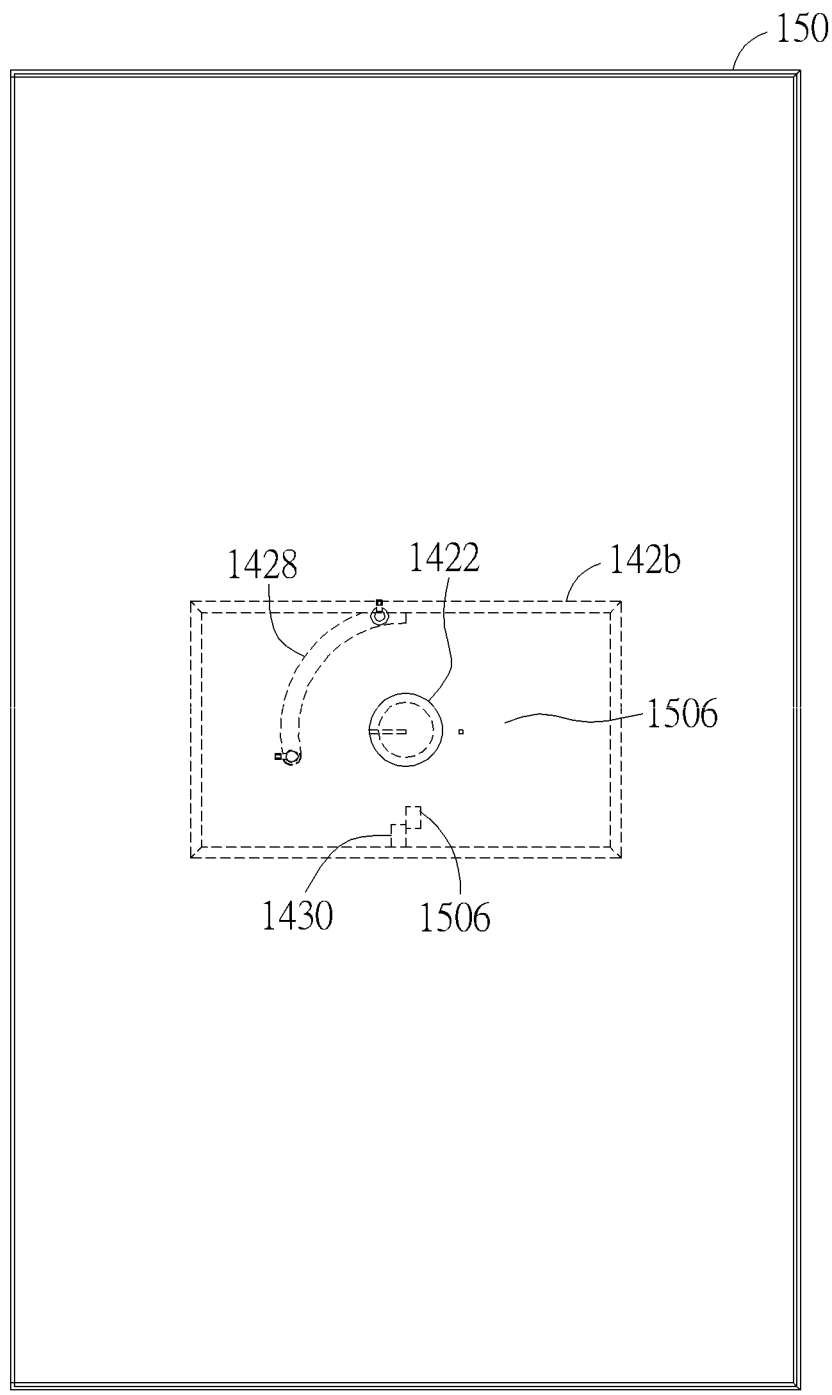
FIG. 17 is a perspective view illustrating a state after the rotating member rotates with respect to the second sliding member.

Referring to FIGS. 16 and 17, FIG. 16 is a perspective view illustrating a state before the rotating member 150 rotates with respect to the second sliding member 142b and FIG. 17 is a perspective view illustrating a state after the rotating member 150 rotates with respect to the second sliding member 142b. As shown in FIG. 2, the second sliding member 142b of the sliding module 142 may further has a first restraining portion 1430. As shown in FIG. 6, the rotating member 150 may further has a second restraining portion 1506. The first restraining portion 1430 can cooperates with the second restraining portion 1506 to restrain a rotating angle of the rotating member 150. As shown in FIGS. 16 and 17, the first restraining portion 1430 can cooperates with the second restraining portion 1506 to restrain a rotating angle of the rotating member 150 to be 90 degrees.

When the user wants to switch the display module 12 from portrait mode (as shown in FIG. 14) to landscape mode (as shown in FIG. 1), the user has to rotate the rotating member 150 with the display module 12 from the position shown in FIG. 14 to the position shown in FIG. 10 and then press down the rotating member 150 with the display module 12 to the position shown in FIG. 1. At this time, the bended first and second resilient plates will generate elastic forces to return the linking member 154 and the engaging member 156 to the initial positions, respectively, such that the engaging member 156 will be engaged with the second sliding member 142b again. Consequently, the rotating member 150 cannot rotate with respect to the sliding module 142. Furthermore, the engaging portion 1460 of the operating member 146 is also engaged in the engaging recess 1420 of the first sliding member 142a, such that the sliding module 142 cannot move with respect to the frame body 140.

Figure 18:
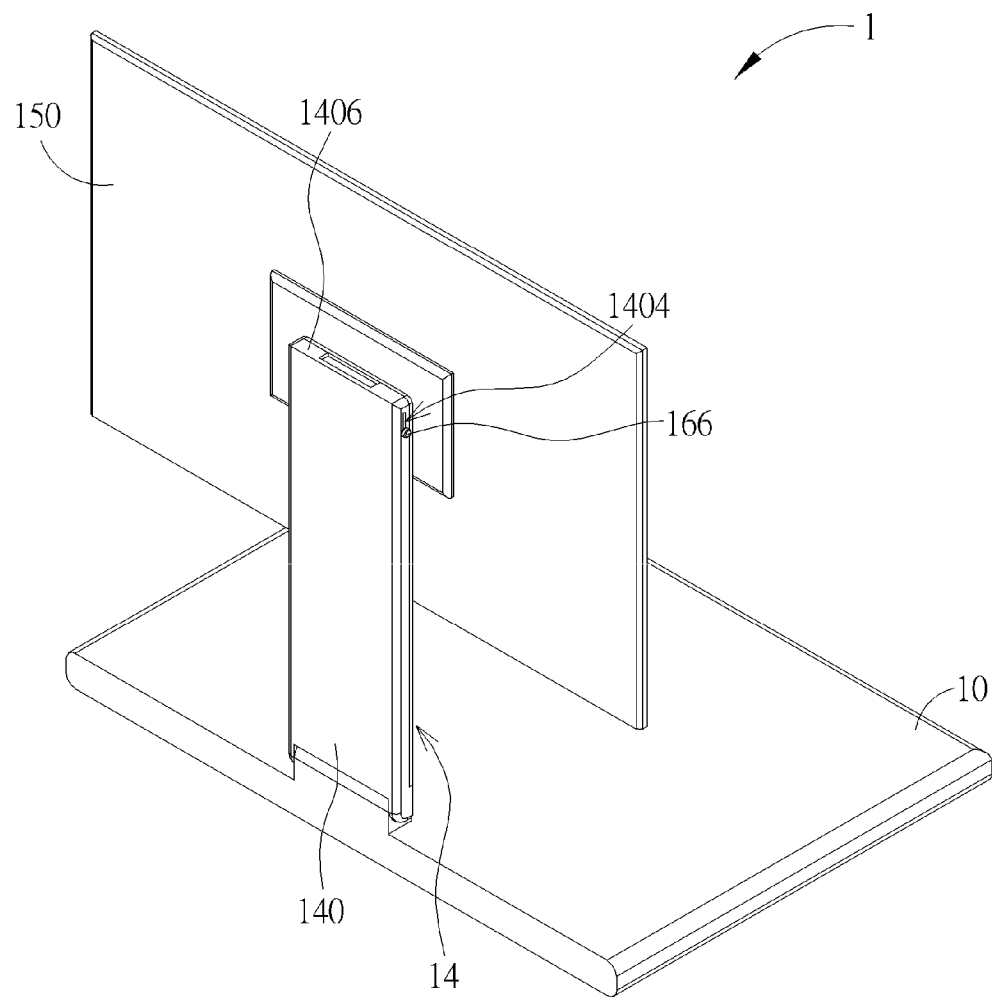
FIG. 18 is a perspective view illustrating the switch member being switched to the lower edge of the first slot.
Figure 19:
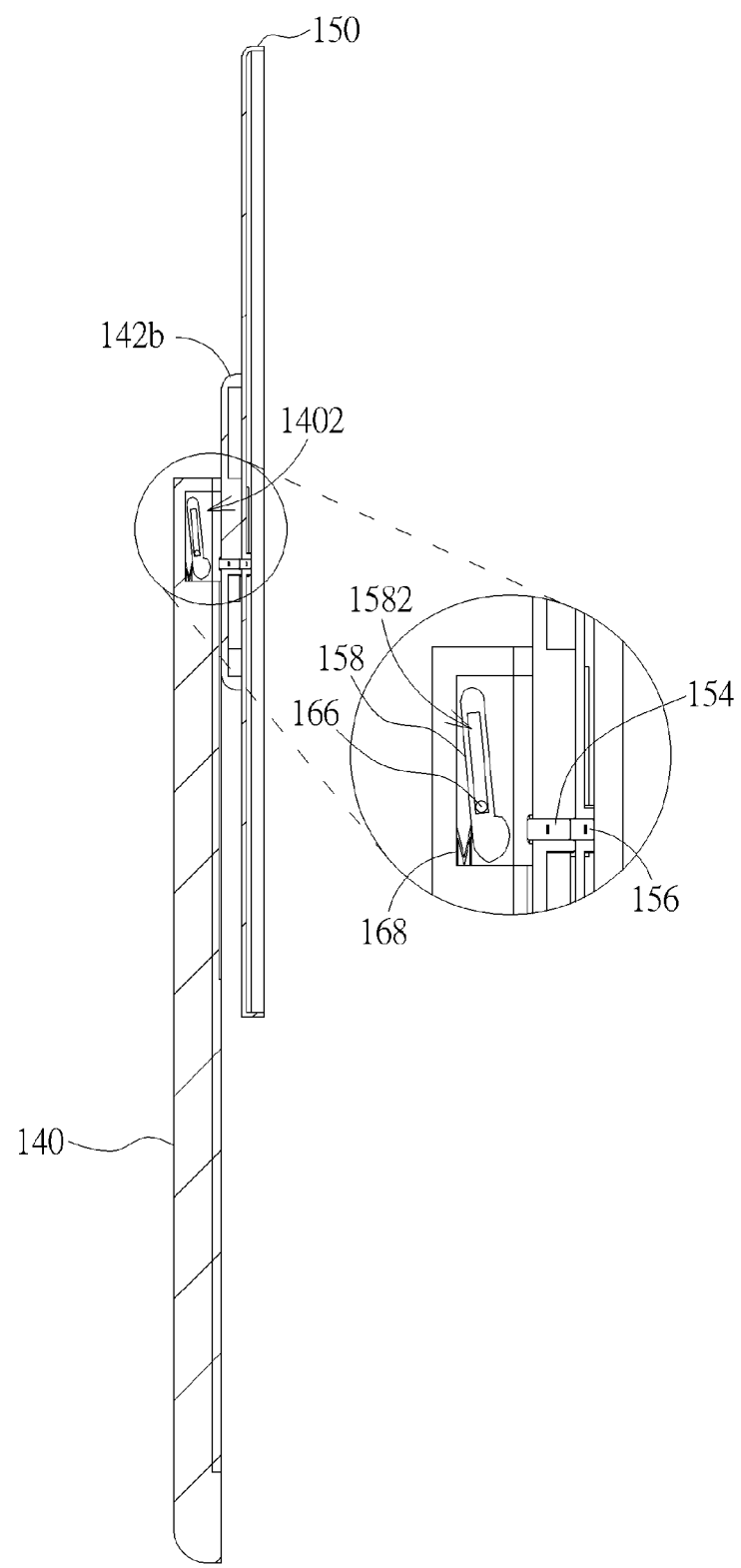
FIG. 19 is a sectional view illustrating the driving member sinking into the accommodating recess.

Referring to FIGS. 18 and 19, FIG. 18 is a perspective view illustrating the switch member 166 being switched to the lower edge of the first slot 1404 and FIG. 19 is a sectional view illustrating the driving member 158 sinking into the accommodating recess 1402. If the user wants the display module 12 to rise automatically only without rotating automatically, the user can switch the switch member 166 to the lower edge of the first slot 1404, as shown in FIG. 18. At this time, the driving member 158 will sink into the accommodating recess 1402, as shown in FIG. 19. Accordingly, when the sliding module 142 rises to the position shown in FIG. 19, the driving member 158 will not push the linking member 154, such that the engaging member 156 is still engaged with the second sliding member 142b of the sliding module 142. Therefore, the rotating member 150 cannot rotate with respect to the sliding module 142.

Figure 20:
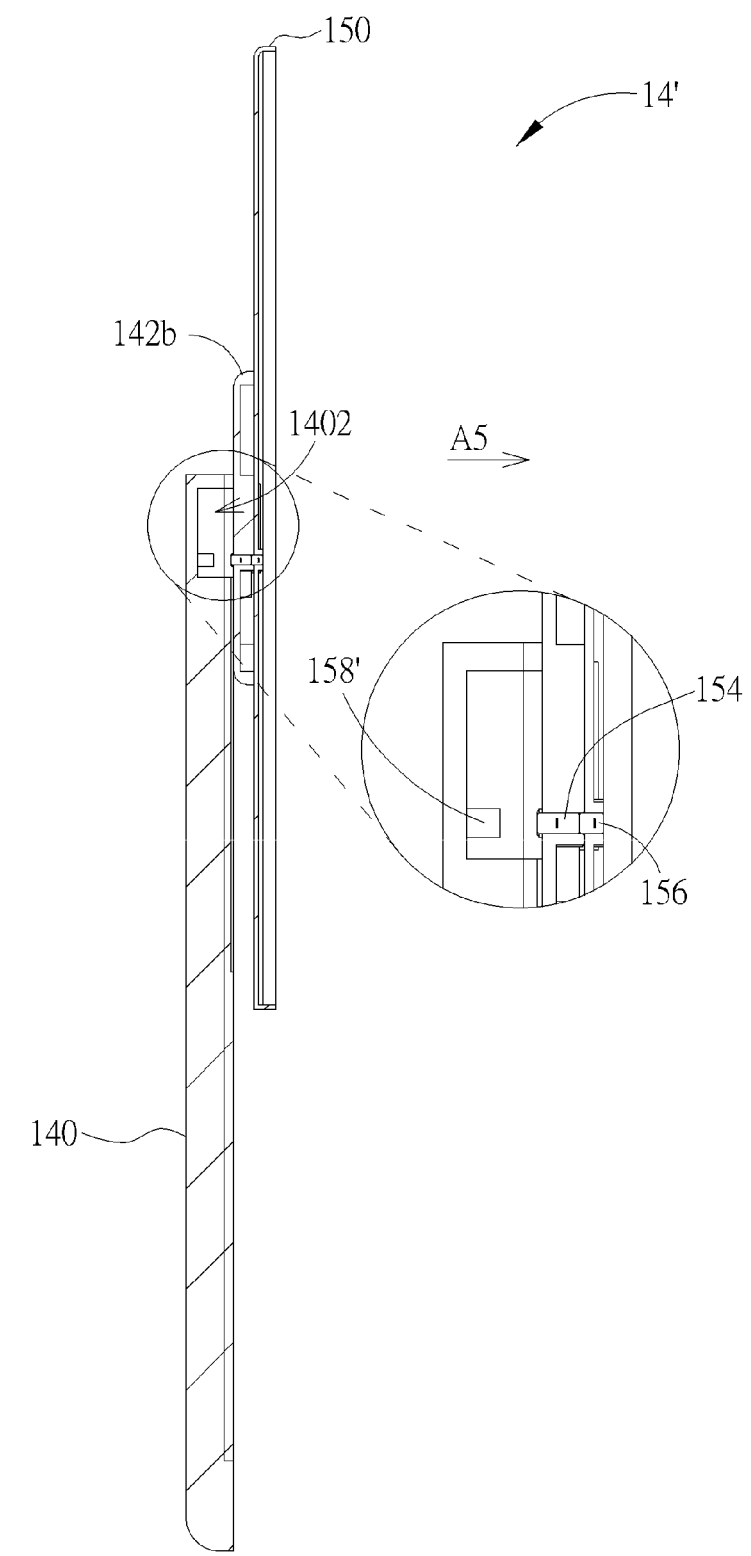
FIG. 20 is a sectional view illustrating a support frame capable of rising automatically and rotating selectively according to another embodiment of the invention.

Referring to FIG. 20, FIG. 20 is a sectional view illustrating a support frame 14' capable of rising automatically and rotating selectively according to another embodiment of the invention. The main difference between the support frame 14' and the aforesaid support frame 14 is that the driving member 158' of the support frame 14' is an electromagnet and the linking member 154 is a magnet or made of a magnetic induction material. The invention may dispose a button (not shown) on the support frame 14' or the base 10 shown in FIG. 1 and allows the user to press the button to turn on/off the driving member 158' through appropriate circuit design. If the user wants the display module to rise and rotate automatically, the user has to press the button to turn on the driving member 158', such that a magnetic repulsion force is generated between the driving member 158' and the linking member 154. Accordingly, when the sliding module 142 rises to the position shown in FIG. 20, the repulsion force generated between the driving member 158' and the linking member 154 will push the linking member 154 in the direction indicated by the arrow A5, such that the engaging member 156 will be disengaged from the second sliding member 142b of the sliding module 142. At this time, the rotating member 150 can rotate with respect to the sliding module 142. On the other hand, if the user wants the display module 12 to rise automatically only without rotating automatically, the user can press the button to turn off the driving member 158'. Accordingly, when the sliding module 142 rises to the position shown in FIG. 20, the driving member 158 will not drive the linking member 154 to mode, such that the engaging member 156 is still engaged with the second sliding member 142b of the sliding module 142. Therefore, the rotating member 150 cannot rotate with respect to the sliding module 142. It should be noted that the same elements in FIG. 20 and FIGS. 1-19 are represented by the same numerals, so the repeated explanation will not be depicted herein again. Moreover, the components mentioned in this embodiment but not shown in FIG. 20 are also the same as those mentioned in the above, so the repeated explanation will not be depicted herein again either.

As mentioned in the above, the invention may dispose the display module on the rotating member of the support frame. When a user presses the press portion of the operating member, the display module will rise and rotate automatically (e.g. rotate with 90 degrees to switch the display module from landscape mode to portrait mode). Accordingly, the operation of the invention is very convenient. It should be noted that the invention may also dispose other objects on the rotating member according to practical applications and the invention is not limited to dispose the display module on the rotating member.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A support frame capable of rising automatically and rotating selectively comprising:
   a frame body having a sliding groove;
   a sliding module slidably disposed in the sliding groove, the sliding module having an engaging recess;
   a first resilient member disposed in the sliding groove, opposite ends of the first resilient member being connected to the frame body and the sliding module, respectively;
   an operating member pivotally connected to the frame body, the operating member having an engaging portion and a press portion, the engaging portion being engaged in the engaging recess, such that the sliding module compresses the first resilient member, the press portion being exposed from the frame body;
   a second resilient member disposed on the frame body, opposite ends of the second resilient member being connected to the frame body and the operating member, respectively;
   a rotating member pivotally connected to the sliding module;
   a torsion member disposed between the sliding module and the rotating member, opposite ends of the torsion member being connected to the sliding module and the rotating member, respectively, the torsion member being twisted in advance before the rotating member rotates with respect to the sliding module;
   a linking member movably disposed on the sliding module;
   an engaging member movably disposed on the rotating member, the engaging member abutting against the linking member and being engaged with the sliding module; and
   a driving member disposed on the frame body;
   wherein when the press portion is pressed, the second resilient member is compressed and the engaging portion is disengaged from the engaging recess, such that the first resilient member generates an elastic force to drive the sliding module to slide along the sliding groove; when the sliding module slides along the sliding groove to drive the linking member to move to a position corresponding to the driving member, the driving member drives the linking member to move and the linking member drives the engaging member to move, such that the engaging member is disengaged from the sliding module; when the engaging member is disengaged from the sliding module, the torsion member generates a torsion to drive the rotating member to rotate with respect to the sliding module.

2. The support frame capable of rising automatically and rotating selectively of claim 1, further comprising a first resilient plate and a second resilient plate, opposite ends of the first resilient plate being connected to the sliding module and the linking member, respectively, opposite ends of the second resilient plate being connected to the rotating member and the engaging member, respectively.

3. The support frame capable of rising automatically and rotating selectively of claim 1, further comprising a cover disposed on the frame body, the cover having a guiding groove, the linking member being located in the guiding groove.

4. The support frame capable of rising automatically and rotating selectively of claim 1, wherein the sliding module has an arc-shaped sliding rail, and the engaging member abuts against the arc-shaped sliding rail and slides along the arc-shaped sliding rail when the rotating member rotates with respect to the sliding module.

5. The support frame capable of rising automatically and rotating selectively of claim 1, wherein the sliding module has a first restraining portion, the rotating member has a second restraining portion, and the first restraining portion cooperates with the second restraining portion to restrain a rotating angle of the rotating member.

6. The support frame capable of rising automatically and rotating selectively of claim 1, further comprising a switch member, the frame body having an accommodating recess and a first slot, the accommodating recess communicating with the first slot, the driving member being pivotally connected in the accommodating recess, the driving member having a second slot, an end of the switch member being movably inserted into the first slot and the second slot.

7. The support frame capable of rising automatically and rotating selectively of claim 6, further comprising a third resilient member disposed in the accommodating recess, opposite ends of the third resilient member being connected to the frame body and the driving member, respectively.

8. The support frame capable of rising automatically and rotating selectively of claim 1, wherein the driving member is an electromagnet and the linking member is a magnet or made of a magnetic induction material.

9. An electronic device comprising:
   a base;
   a display module; and a support frame capable of rising automatically and rotating selectively disposed on the base, the support frame comprising:

a frame body having a sliding groove;

a sliding module slidably disposed in the sliding groove, the sliding module having an engaging recess;

a first resilient member disposed in the sliding groove, opposite ends of the first resilient member being connected to the frame body and the sliding module, respectively;

an operating member pivotally connected to the frame body, the operating member having an engaging portion and a press portion, the engaging portion being engaged in the engaging recess, such that the sliding module compresses the first resilient member, the press portion being exposed from the frame body;

a second resilient member disposed on the frame body, opposite ends of the second resilient member being connected to the frame body and the operating member, respectively;

a rotating member pivotally connected to the sliding module, the display module being disposed on the rotating member;

a torsion member disposed between the sliding module and the rotating member, opposite ends of the torsion member being connected to the sliding module and the rotating member, respectively, the torsion member being twisted in advance before the rotating member rotates with respect to the sliding module;

a linking member movably disposed on the sliding module;

an engaging member movably disposed on the rotating member, the engaging member abutting against the linking member and being engaged with the sliding module; and a driving member disposed on the frame body;

wherein when the press portion is pressed, the second resilient member is compressed and the engaging portion is disengaged from the engaging recess, such that the first resilient member generates an elastic force to drive the sliding module to slide along the sliding groove; when the sliding module slides along the sliding groove to drive the linking member to move to a position corresponding to the driving member, the driving member drives the linking member to move and the linking member drives the engaging member to move, such that the engaging member is disengaged from the sliding module; when the engaging member is disengaged from the sliding module, the torsion member generates a torsion to drive the rotating member to rotate with respect to the sliding module.

10. The electronic device of claim 9, wherein the support frame further comprises a first resilient plate and a second resilient plate, opposite ends of the first resilient plate are connected to the sliding module and the linking member, respectively, and opposite ends of the second resilient plate are connected to the rotating member and the engaging member, respectively.

11. The electronic device of claim 9, wherein the support frame further comprises a cover disposed on the frame body, the cover has a guiding groove, and the linking member is located in the guiding groove.

12. The electronic device of claim 9, wherein the sliding module has an arc-shaped sliding rail, and the engaging member abuts against the arc-shaped sliding rail and slides along the arc-shaped sliding rail when the rotating member rotates with respect to the sliding module.

13. The electronic device of claim 9, wherein the sliding module has a first restraining portion, the rotating member has a second restraining portion, and the first restraining portion cooperates with the second restraining portion to restrain a rotating angle of the rotating member.

14. The electronic device of claim 9, wherein the support frame further comprises a switch member, the frame body has an accommodating recess and a first slot, the accommodating recess communicates with the first slot, the driving member is pivotally connected in the accommodating recess, the driving member has a second slot, and an end of the switch member is movably inserted into the first slot and the second slot.

15. The electronic device of claim 14, wherein the support frame further comprises a third resilient member disposed in the accommodating recess, and opposite ends of the third resilient member are connected to the frame body and the driving member, respectively.

16. The electronic device of claim 9, wherein the driving member is an electromagnet and the linking member is a magnet or made of a magnetic induction material.

* * * * *